(12) United States Patent
Dirkes, II

(10) Patent No.: US 6,431,457 B1
(45) Date of Patent: Aug. 13, 2002

(54) AIR HEATER CONTROL

(75) Inventor: James V. Dirkes, II, Grand Rapids, MI (US)

(73) Assignee: Rapid Engineering, Inc., Comstock Park, MI (US)

( * ) Notice: Subject to any disclaimer, the term of this patent is extended or adjusted under 35 U.S.C. 154(b) by 47 days.

(21) Appl. No.: 09/660,800

(22) Filed: Sep. 13, 2000

Related U.S. Application Data
(60) Provisional application No. 60/156,919, filed on Sep. 28, 1999.

(51) Int. Cl.⁷ .............................. F24H 3/02; F24F 7/00
(52) U.S. Cl. .................... 236/11; 126/110 C; 236/91 F; 237/46
(58) Field of Search .............................. 236/91 F, 91 R, 236/11; 165/249, 212; 454/229; 237/46; 126/110 C, 80

(56) References Cited

U.S. PATENT DOCUMENTS

| | | | |
|---|---|---|---|
| 4,274,392 A | 6/1981 | Myers | 126/112 |
| 4,325,352 A | 4/1982 | Dirkes | 126/110 |
| 4,347,832 A | 9/1982 | Myers | 126/112 |
| 4,429,679 A | 2/1984 | Dirkes | 126/110 |
| 4,480,629 A * | 11/1984 | Williams | 126/110 C |
| 4,519,539 A | 5/1985 | Bussjager et al. | 236/13 |
| 4,645,450 A | 2/1987 | West | 431/12 |
| 4,674,475 A * | 6/1987 | Powis | 126/110 C |
| 5,146,977 A | 9/1992 | Kiser | 165/15 |
| 5,190,454 A | 3/1993 | Murray et al. | 432/103 |
| 5,257,958 A | 11/1993 | Jagers | 454/238 |
| 5,259,553 A | 11/1993 | Shyu | 236/49.3 |
| 5,290,188 A | 3/1994 | Kiser et al. | 454/234 |
| 5,486,107 A | 1/1996 | Bonne | 431/12 |
| 5,511,971 A | 4/1996 | Benz et al. | 431/9 |
| 5,599,179 A | 2/1997 | Lindner et al. | 431/12 |
| 5,634,786 A | 6/1997 | Tillander | 431/90 |
| 5,791,408 A | 8/1998 | Seem | 165/250 |
| 5,881,806 A | 3/1999 | Rudd | 165/244 |
| 5,915,960 A * | 6/1999 | Check et al. | 126/110 C |

OTHER PUBLICATIONS

Commonly assigned, co–pending U.S. Patent Application, Ser. No. 09/291,467, filed Apr. 14, 1999 by James V. Dirkes, II et al. for Dewpoint Based Humidity Control, Now Abandoned.

* cited by examiner

Primary Examiner—William Wayner
(74) Attorney, Agent, or Firm—Van Dyke, Gardner, Linn & Burkhart, LLP

(57) ABSTRACT

A heater control system is operable to modulate a heater of a building or warehouse or the like, in order to maintain the temperature rise of air passing through the heater at or below a maximum allowable temperature rise value. The maximum allowable temperature rise value is determined by a percentage or proportion of outside air being inducted into the heater and the type of heater, in order to limit the accumulation of carbon dioxide within the building. The control system is operable to modulate the heater in response to an outside air temperature, an inside or return air temperature, and the proportion of outside air to return air being inducted into the heater. Preferably, the proportion of outside air is determined by a position of a damper, which is operable to vary the relative flows of outdoor air and return air which are inducted into the heater. The control system monitors the temperature of the discharge air from the heater and modulates the heater to maintain the discharge air temperature below a value based on the maximum allowable temperature rise, the indoor and outdoor air temperatures, and the proportion of outdoor air being inducted into the heater. Optionally, the control may adjust a position of the damper to maintain the temperature rise below the maximum allowable temperature rise. The present invention thus provides a low cost control system which ensures that the temperature rise of air passing through the heater is maintained below the maximum allowable value for any given proportion of outdoor air being inducted therein.

23 Claims, 3 Drawing Sheets

AIR HEATER CONTROL

CROSS REFERENCE TO RELATED APPLICATION

The present application claims priority on U.S. Provisional Pat. Application, Ser. No. 60/156,919, filed Sep. 28, 1999, which is hereby incorporated in its entirety herein by reference.

BACKGROUND OF THE INVENTION

The present invention relates generally to heater controls for buildings, such as warehouses or the like and, more particularly, to a heater control which controls the heater such that a temperature rise in the air of the warehouse or building does not exceed a maximum temperature rise value.

Direct fired recirculating industrial air heaters are operable to discharge heated air through ducts within a building or structure, such as a warehouse, storage facility or the like. National Standards mandate that the amount of heat added by the heaters in proportion to the amount of outdoor air being introduced into the building is below a predetermined maximum temperature rise value. More particularly, ANSI Z83.18 mandates control of the amount of heat added in proportion to the amount of outdoor air introduced into the heater. The standard sets the maximum allowable temperature rise based upon the actual percentage of outdoor air being inducted into the heater. The maximum temperature rise is determined by the percentage of outdoor air and a "k" factor associated with the type of fuel that is used for heating the building. For example, the k factor for natural gas is 1.04. This requirement is intended to limit the potential for excessive accumulation of carbon dioxide ($CO_2$) within the building.

However, it is difficult to determine the actual percentage of outdoor air being inducted in a precise manner without excessive cost to the air heating system. Flow sensors may be installed in the outdoor and return airstreams and the fraction or percentage of outdoor air being inducted may be calculated based on their measurements. The outdoor and return airstream temperatures can then be measured, whereby the average mixed temperature, using the outdoor air and return air fractions and temperatures, may be calculated and subtracted from the measured discharge temperature. Although this would provide an accurate measurement of outdoor air fraction and temperature rise of air in the heater, it is expensive due to the high cost of flow sensors.

Without flow sensors, it is difficult to determine the precise amount of outdoor air being inducted, and the temperature of the total air being inducted into the heater (i.e. the mixed air temperature), since some heater designs have a small mixing chamber where it is difficult to obtain an accurate measurement. Also, some designs provide more than one outdoor air path, which may adversely affect the accuracy of the temperature sensor of the mixing chamber, depending on the location of the sensor. Additionally, the heater or burner may be provided in one of the air paths of some designs, which further adversely affects the temperature readings in determining the mixing air temperature.

Therefore, there is a need in the art for a low cost system for controlling a heater which heats a building to a desired temperature, while maintaining the rise in temperature in the air in the heater below a maximum temperature rise determined by the percentage of outdoor air being inducted into the heater of the building.

SUMMARY OF THE INVENTION

The present invention is intended to provide a low cost control system for controlling a heater or furnace within a building, whereby the temperature rise of the air flowing through the heater is maintained below a maximum temperature rise value. The maximum temperature rise value is determined by a percentage of outdoor air being inducted into the heater of the building, with respect to the return air also being inducted into the heater from within the building. The control of the present invention measures the temperature of the outdoor air and of the return air and determines a percent of outdoor air being inducted into the heater via a position of a damper at the building (through which the outdoor air is inducted into the building) and an efficiency or error rating of the damper. The heater is modulated in response to the temperature sensors and position of the damper.

According to an aspect of the present invention, a recirculating air heater comprises a heater, an outdoor air path and a return air path into the heater, a damper, first and second temperature sensors, and a control. The damper is movable to adjust relative flows through the outdoor air and return air paths. The first temperature sensor is operable to measure outdoor air temperature at the outdoor air path, while the second temperature sensor is operable to measure return air temperature at the return air path. The control is operable to control the burner of the heater in response to the first temperature sensor, the second temperature sensor, and a position of the damper. Preferably, the present invention includes a third temperature sensor at a discharge air path, which measures a discharge air temperature. The control is preferably further responsive to the third temperature sensor. The position of the damper may be determined by a position sensor at the damper.

According to another aspect of the present invention, a method of controlling a recirculating air heater which has a heater or burner, an outdoor air path, a return air path, a discharge air path and a damper, comprises providing a first temperature sensor which measures outdoor air temperature at the outdoor air path. A second temperature sensor is provided which measures return air temperature at the return air path. The damper is movable to adjust the relative flows through the outdoor and return air paths. The control controls or modulates the burner in response to the first temperature sensor, the second temperature sensor, and/or a position of the damper.

Therefore, the present invention provides a heater control which modulates or adjusts an output of the heater to increase the temperature of a building to a desired level, while maintaining a temperature rise of air through the heater at or below a maximum allowable temperature rise, as determined by a percentage of outdoor air being inducted into the heater. The heater control system provides a low cost system, which includes temperature sensors for measuring outdoor air temperature, return air temperature, and the discharge air temperature of the heater. The heater may thus be modulated to maintain an appropriate rise in temperature, without costly flow sensors and the like.

DESCRIPTION OF THE PREFERRED EMBODIMENTS

Figure 1:
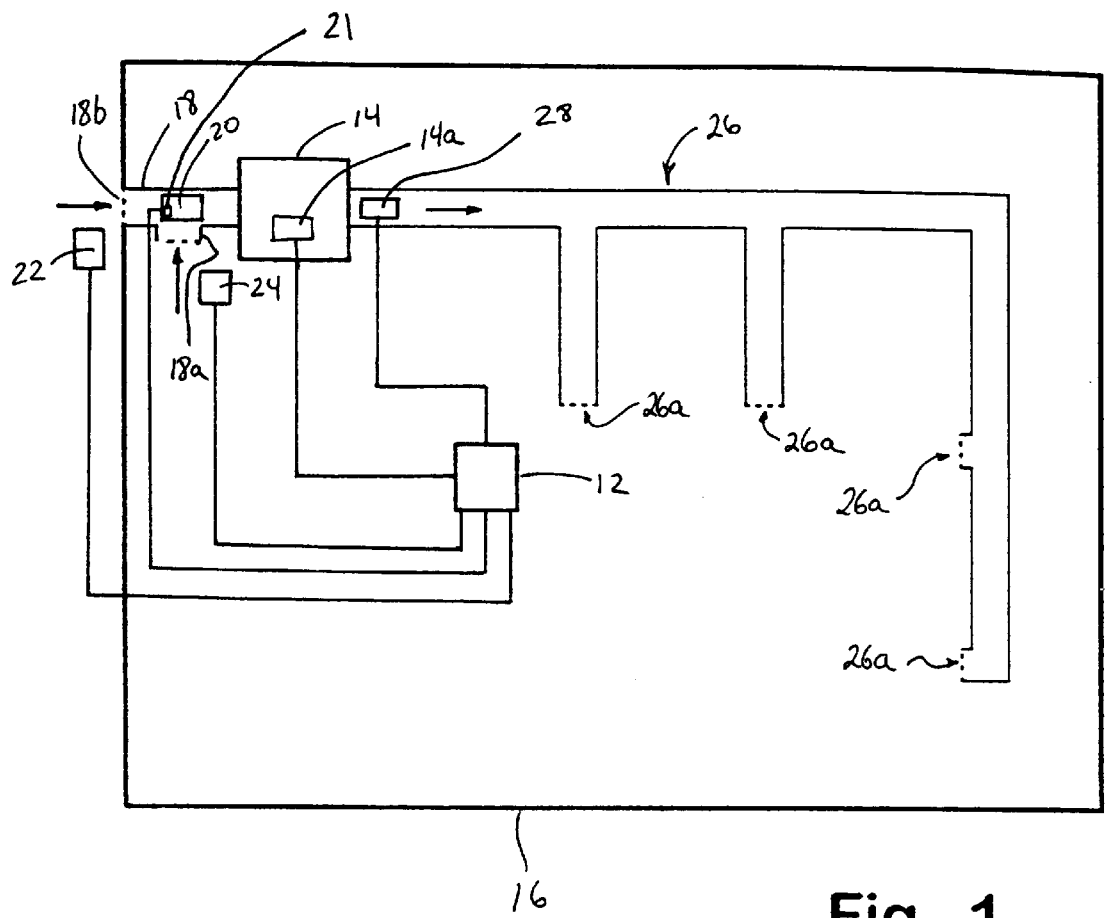
FIG. 1 is a schematic of a storage facility incorporating a heater control system according to the present invention.
Figure 2:
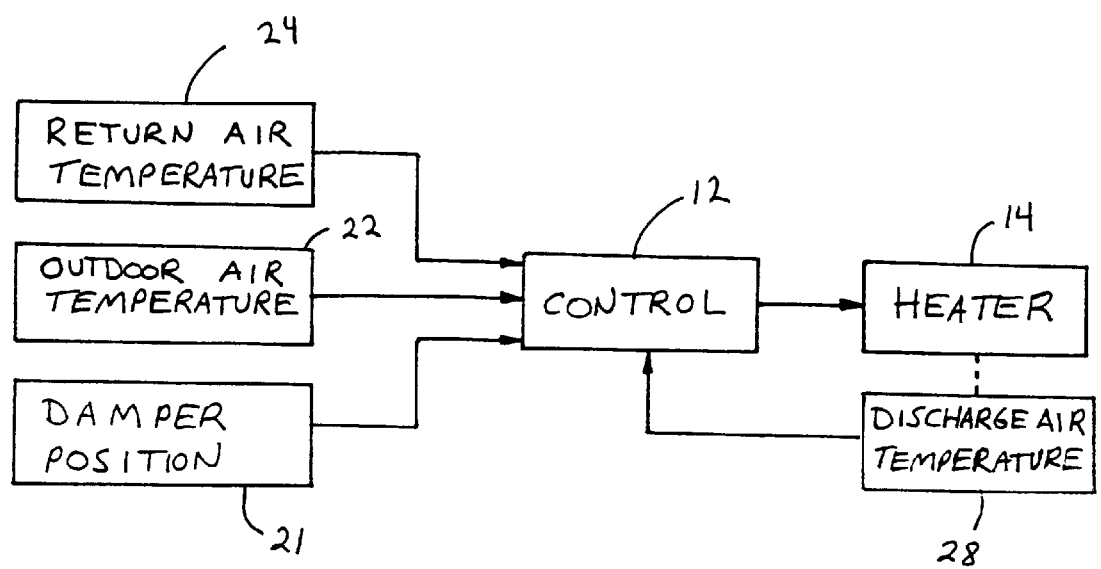
FIG. 2 is a block diagram of an electronic control system according to the present invention.

Referring now specifically to the drawings and the illustrative embodiments depicted therein, an air heater control system 10 includes a control 12 which controls a heater 14 to adjust an interior temperature of a building 16, such as a warehouse, or other storage facility or the like (FIG. 1). Heater 14 receives air from an induct chamber or duct 18, which further receives outdoor air and return air, and is operable to heat the air to attain a desired temperature inside building 16. A proportion of the flows of the outdoor air and return air is controlled by a damper 20 within duct 18. Control system 10 further includes an outdoor air temperature sensor 22 and an indoor or return air temperature sensor 24, which are operable to measure the respective temperatures of the air flowing into duct 18. The return air temperature sensor 24 is operable to measure the air flowing into duct 18 from within the building, and may be positioned elsewhere in the building (remote from the duct 18), since the interior temperature of the building typically accurately represents the return air to the heater. Control 12 is operable to adjust or modulate a burner or heating element 14a within heater 14 to adjust a discharge air temperature in response to a position of damper 20, and the temperatures sensed by outdoor temperature sensor 22 and indoor or return temperature sensor 24. Control 12 is operable to adjust heater 14 to maintain a temperature rise in the air inducted into the heater below a maximum temperature rise value determined by the position of the damper and type of heater.

The maximum temperature rise value is a function of the type of heater and the position of the damper, and thus varies with the amount of outdoor air being introduced by the air handler. The maximum temperature rise is mandated by a National Standard for Direct Fired Recirculating Industrial Air Heaters (ANSI Z83.18) and is intended to limit the potential for excessive accumulation of carbon dioxide ($CO_2$) within the building or warehouse being heated. The temperature rise value depends on the damper position and also depends on the type of heater, such as either Natural Gas or Liquefied Petroleum. The temperature rise is calculated by the following equation:

$$\Delta T = \text{Actual} \%OA * CO_2 / 19.63 / k; \tag{1}$$

where Actual %OA is the actual proportion of outside air that is inducted into the heater (not readily determinable), $CO_2$ is the allowable concentration of Carbon Dioxide (in parts per million (ppm)) within the building, and k is the factor of the fuel burned by the heater, such as 1.04 for natural gas. The allowable concentration of Carbon Dioxide may vary and is typically set by the National Standards. For the purposes of the discussion below, the allowable concentration is selected to be 5000 ppm.

Heater 14 is preferably a conventional direct fired recirculating air heater and is connected to at least one induction duct 18 and at least one discharge duct 26, which disperses the heated discharge air from the heater 14 into the interior of the building 16 via one or more vents 26a or the like, as is known in the art. Heater 14 may be fueled by natural gas or Liquefied Petroleum (LP) fuel, which are burned by burner 14a to generate heat for heating the air flowing through the heater 14. Typically, the heater 14 will be activated in response to the interior temperature of the building dropping below a threshold amount, such that a desired temperature or range of temperatures are maintained within the building.

Induction duct 18 includes at least one interior return duct or vent 18a and at least one outdoor air duct or vent 18b, which allows air from outside the building 16 to be inducted into duct 18 and toward heater 14. At least one damper 20 is positioned at or adjacent return duct 18a and outdoor air duct 18b. Damper 20 is adjustable to adjust the amount of or percentage of outdoor air flowing to heater 14 in proportion to the return air from within the building. For example, damper 20 may be positioned to allow fifty percent of the air passing therethrough to be from the outside, while the other fifty percent is return air from within the building 16. Damper 20 may be set to allow any range of proportionate air flows and may be adjustable either manually or automatically to control the relative air flows into heater 14. Preferably, control system 10 includes a damper position sensor 21 which is operable to determine the position or setting of damper 20.

Control 12 is operable to monitor outdoor air temperature sensor 22, indoor or return air temperature sensor 24 and a discharge air temperature sensor 28, which measures the heated air being discharged from heater 14 via discharge duct 26. Control system 10 is operable to adjust or modulate the discharge air temperature of the heater in order to avoid exceeding the allowable temperature rise of air passing through the heater. This is preferably accomplished via adjusting the gas valve output of heater element 14a of heater 14 to adjust the discharge air temperature accordingly.

Preferably, control 12 is operable to modulate heater 14 such that the discharge air temperature is maintained according to the following equation:

$$T_{DA} = \Delta T + \%OA * T_{OA} + T_{RA}(1 - \%OA); \tag{2}$$

where $T_{DA}$ is the discharge air temperature, $\Delta T$ is the maximum allowable temperature rise for the given proportion of outdoor air, %OA is the proportion of outdoor air being inducted into the heater, $T_{OA}$ is the temperature of the outdoor air, and $T_{RA}$ is the temperature of the interior or return air. By maintaining the discharge air temperature at or below the value calculated by the above equation, control system 10 can modulate the heater 14 so that the maximum temperature rise values are not exceeded.

For example, when 25 percent of the air inducted into a natural gas heater is outdoor air, the maximum allowable temperature rise is 61.2° F., based on equation (1). Accordingly, as determined by equation (2), for an outdoor air temperature of zero and a return air temperature of 60, the maximum discharge air temperature of the heater is 106.2° F. Therefore, as long as the heater is modulated to maintain the discharge air temperature at a level at or below 106.2°, the maximum allowable temperature rise value will not be exceeded.

However, outdoor air/return air mixing dampers do not typically operate in a perfectly linear manner. In other words, when the dampers are set or closed 50 percent of the way, the amount of outdoor air being inducted through the dampers may be greater than or less than 50 percent. Although the dampers typically are roughly linear, the discrepancy may be 10 to 20 percent or even more, depending on the damper design. The proportion of outdoor air thus may not always be determinable via a simple measurement of the position of the damper. Accordingly, the above equation is preferably modified to accommodate any errors associated with the damper position and the temperature sensors. In order to determine the error or efficiency of the damper, the particular damper design may be thoroughly tested, such that the actual relationship of the damper's stroke to the actual outdoor air fraction may be determined. The relationship of the damper position or setting and the actual proportion of outdoor air being inducted may be determined for purposes of the temperature rise equations via a worst case error, a tabulation of damper stroke versus outdoor air fraction, or a curve fitting procedure, or any other means of providing an accurate estimation or calculation of the actual outdoor air fraction being inducted into the heater based on a position of the damper. Additionally, the accuracy of the temperature sensors preferably is incorporated into the equation to provide a worst case error in the temperature sensors, in order to ensure that satisfaction of the equation maintains the temperature rise below the maximum allowable levels.

Accordingly, equation (1) is preferably modified as follows:

$$\Delta T = (Set\%OA(1-ER\%oa))*CO_2/19.63/k; \quad (3)$$

where Set%OA is the percent of outside air as set by the damper, and ER%oa is the maximum damper feedback error, or any other error associated with the damper. Equation (2) is similarly preferably modified as follows:

$$T_{DA} = \Delta T + (Set\%OA(1-ER\%oa))*(T_{OA}-ERtoa) + (T_{RA}-ERtra)*(1-(Set\%OA(1-ER\%oa))); \quad (4)$$

where ERtoa is the error associated with the outside air temperature sensor 22, and ERtra is the error associated with the return air temperature sensor 24. The above equation (4) thus ensures that the temperature rise in air in the heater remains below the maximum allowable temperature rise, as set by the Direct Fired Recirculating Industrial Air Heater Standard and calculated according to the modified equation (3), above. For example, with a maximum allowable concentration of Carbon Dioxide of 5000 ppm, if the maximum damper feedback error is determined to be approximately 30 percent, and the damper is set to induct approximately 25 percent of outdoor air into a natural gas heater, then the maximum temperature rise through the heater is approximately 42.9° F. If the accuracy of sensors 22 and 24 is plus or minus 2 degrees, then the maximum discharge air temperature is 90.4°, again with the outdoor air temperature being zero degrees, the return air temperature being 60°, and the damper setting being at 25% of outdoor air, as discussed above. This assures that the maximum temperature rise will be maintained below the maximum allowable value, taking into account the potential errors associated with the measuring devices of control system 10.

It is further envisioned that the heater control of the present invention may be operable without an adjustable damper, whereby the building has a fixed induct or vent for inducting outdoor air into the building. The size of the induct then determines the amount of air being inducted into the building and thus remains substantially constant. The equations above are equally applicable to such a system, since the amount of air being inducted can be determined and then applied to the equations, whereby the heater can then be modulated in response to the indoor and outdoor air temperatures and the proportion of outdoor air with respect to the return air being inducted into the building and/or the heater.

It is also further envisioned that the control system may be operable without a discharge air temperature sensor, since the discharge air temperature may be estimated or calculated based on the burn characteristics of the fuel and the amount of fuel being burned by the heater. The heater control is then operable to modulate the amount of fuel being burned in response to the above equations, with the discharge air temperature being a function of the type of fuel and the amount of fuel being burned at that time, and may further be a function of the efficiency or burning characteristics of the particular heater.

Figure 3:
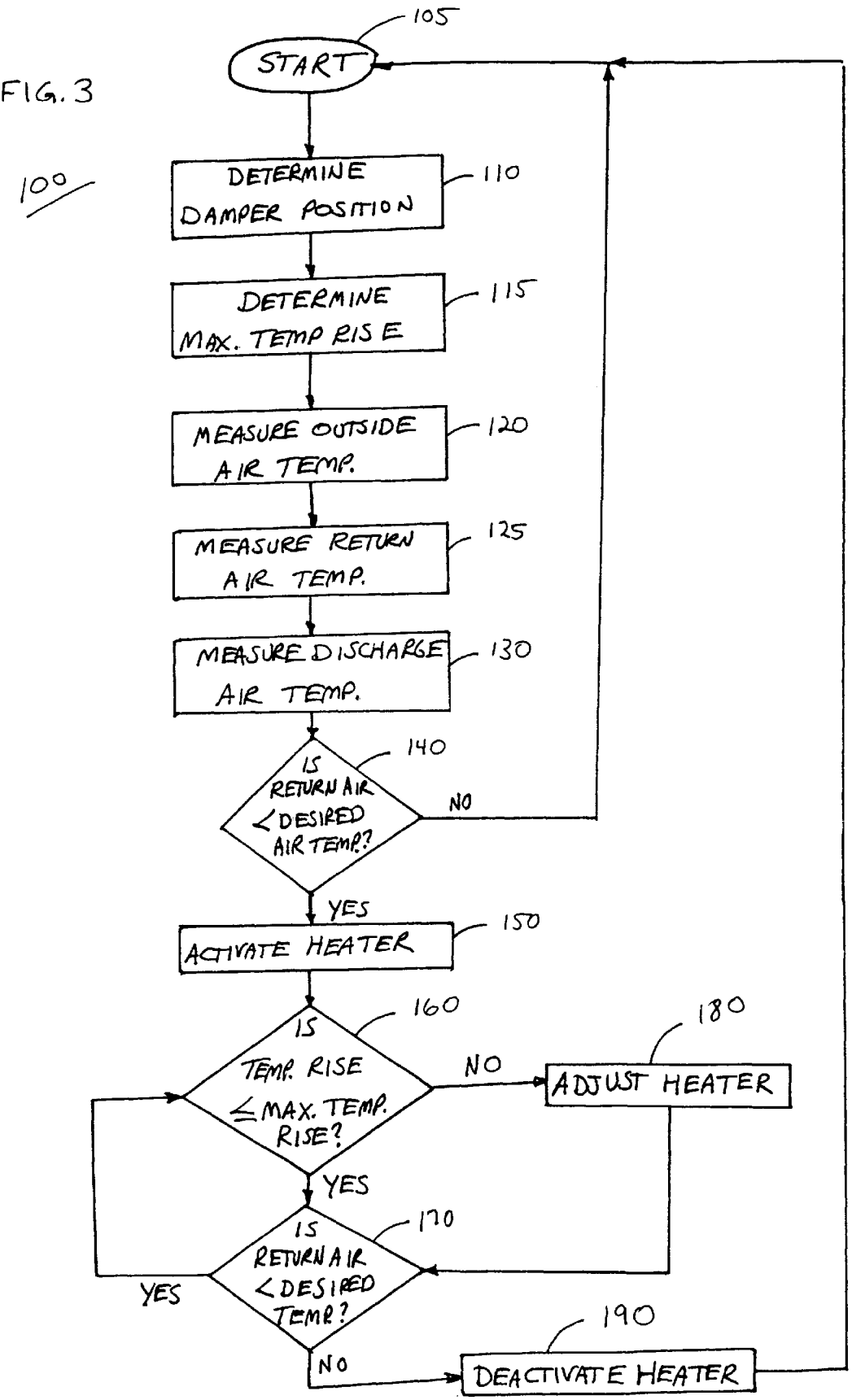
FIG. 3 is a flow chart of a control process according to the present invention.

Referring now to FIG. 3, a control process 100 is shown which modulates or adjusts the heater to maintain the temperature rise of air through the heater at or below the maximum allowable value. Process 100 starts at 105 and determines a damper position at 110. The maximum temperature rise is then determined at 115, such as via equation (1) or (3), based on the damper position or actual proportion of outdoor air being inducted to the heater. Process 100 measures the outside air temperature at 120, measures the return air temperature at 125, and measures the discharge air temperature at 130. It is then determined at 140 whether the interior temperature of the building is less than a desired air temperature. If the interior air temperature is not less than the desired air temperature, then the process 100 returns to start 105 and continues, since the heater does not need to be activated to heat the building to the desired temperature. If the interior air temperature is less than the desired air temperature, then process 100 activates the heater at 150 to increase the air temperature within the building toward the desired temperature. It is then determined at 160 whether the discharge air temperature and temperature rise of air through the heater is less than or equal to the maximum allowable temperature rise determined at 115. This is accomplished via equations (2) or (4) discussed above.

If the temperature rise is less than the maximum temperature rise, it is then determined whether the interior air temperature is still less than the desired air temperature at 170. If the interior air temperature is less than the desired air temperature, the process 100 continues to determine at 160 whether the temperature rise of the air through the heater remains below the maximum temperature rise value. On the other hand, if it is determined at 160 that the temperature rise is greater than the maximum allowable temperature rise, or within a safety factor or range of the maximum temperature rise value, then process 100 adjusts or reduces the heater at 180, such that the discharged air temperature is reduced at the heater. It is then again determined at 170 whether the interior air temperature is less than the desired air temperature. If the interior air temperature is greater than or equal to the desired interior air temperature at 170, then process 100 deactivates the heater at 190 and returns to start at 105 and continues to monitor the sensors. Accordingly, the discharge air temperature, and thus the temperature rise of air within the heater, is modulated to heat the interior air of the building to the desired air temperature, while maintaining the temperature rise below the maximum allowable value.

Although described as modulating the burner 14a of heater 14 to adjust the discharge temperature, it is further envisioned that control 12 may additionally, or otherwise, be operable to adjust a damper position or setting to modify or modulate the proportion of outdoor air being inducted into the heater, without affecting the scope of the present invention. Modulation of the damper position results in a change in the maximum allowable temperature rise, whereby the temperature rise through the heater may remain below the adjusted or increased maximum allowable temperature rise. For example, if the damper is adjusted to increase the actual proportion of outdoor air from 25 percent to 40 percent, the maximum allowable temperature rise value similarly increases from 61.2° to 98°, according to equation (1). The maximum temperature of the discharge air is correspondingly increased from 106.2° to 134°, according to equation (2), with the return air temperature at 60° and the outdoor air temperature at 0°, as discussed above. By increasing the proportion of outdoor air being inducted into the heater and thus the maximum temperature rise, the discharge air of the heater may not have to be reduced or adjusted, yet the temperature rise through the heater may remain below the maximum allowable temperature rise. A similar increase results from the use of the preferred equations (3) and (4).

Therefore, the present invention provides a heater control which adjusts or reduces the discharge temperature of a heater, or adjusts a proportion of outdoor air inducted into the heater, in order to maintain a temperature rise of the air that is inducted into the heater below a predetermined maximum allowable value. The maximum allowable value is based on the proportion of outdoor air being inducted into the heater and the type of heater. The control calculates the maximum discharge air temperature as a function of the maximum allowable temperature rise, the return air temperature, the outdoor air temperature, and the proportion of outdoor air being inducted into the heater. The proportion of outdoor air may further be determined by a damper positioning sensor, which detects the position of the damper and thus the proportion of outdoor air flowing therethrough. Preferably, the present invention takes into account errors or efficiencies of the temperature sensors and dampers, in order to ensure that the temperature rise of air through the heater remains below the maximum allowable value. The error or efficiency of the damper may be determined by a tabulation of data, a worst case error, or a curve-fitting procedure or the like. The present invention is applicable to direct fired recirculating industrial air heaters, and is equally applicable to natural gas heaters or LP heaters.

Changes and modifications in the specifically described embodiments can be carried out without departing from the principles of the invention, which is intended to be limited only by the scope of the appended claims, as interpreted according to the principles of patent law.

The embodiments of the invention in which an exclusive property or privilege is claimed are defined as follows:

1. A direct fired recirculating air heater, comprising:
   a burner;
   an outdoor air path to said heater and a return air path to said heater;
   a first temperature sensor which is operable to measure outdoor air temperature and a second temperature sensor which is operable to measure return air temperature; and
   a control which is operable to control said heater in response to at least said first and second temperature sensors and an amount of outdoor air being inducted to said heater via said outdoor air path.

2. The direct fired recirculating air heater in claim 1 further including a damper which is movable to adjust relative flows through said outdoor and return air paths, said control being operable to control at least one of said burner and said damper in response to said first and second temperature sensors and a position of said damper.

3. The direct fired recirculating air heater in claim 2 further including a discharge air path from said heater and a third temperature sensor measuring a discharge air temperature at said discharge air path.

4. The direct fired recirculating air heater in claim 3, wherein said control is further responsive to said third temperature sensor.

5. The direct fired recirculating air heater in claim 4, wherein said control is operable to control said at least one of said burner and said damper such that a temperature rise of air passing through said heater does not exceed a maximum allowable temperature rise determined by a position of said damper.

6. The direct fired recirculating air heater in claim 5, wherein the maximum allowable temperature rise is determined by the position of said damper and an error associated with said damper.

7. The direct fired recirculating air heater in claim 5 including a position sensor which is operable to sense a position of said damper.

8. The direct fired recirculating air heater in claim 7, wherein said control is operable to calculate a maximum discharge air temperature in response to said position sensor and said first and second temperature sensors.

9. The direct fired recirculating air heater in claim 5, wherein said control is operable to control said burner and maintain the discharge air temperature according to the following equation:

$$T_{DA} \leq \Delta T + (\%OA * T_{OA}) + T_{RA} * (1-\%OA);$$

wherein $T_{DA}$ is the discharge air temperature, $\Delta T$ is the maximum allowable temperature rise, $\%OA$ is a percentage of outdoor air of the total air being inducted into said air heater, $T_{OA}$ is the outside air temperature, and $T_{RA}$ is the return air temperature.

10. The direct fired recirculating air heater in claim 9, wherein the maximum allowable temperature rise and the percentage of outdoor air are determined by a position of said damper.

11. The direct fired recirculating air heater in claim 10, wherein the maximum allowable temperature rise is determined by said percentage of outdoor air and said percentage of outdoor air is determined by the equation:

$$\%OA = Set\%OA(1-ER\%oa);$$

wherein $Set\%OA$ is the position of said damper and $ER\%oa$ is an error associated with the position of said damper and an actual proportion of outside air passing through said damper.

12. The direct fired recirculating air heater in claim 11, wherein said control is operable to control said burner and maintain the discharge air temperature according to the following equation:

$$T_{DA} \leq (Set\%OA(1-ER\%oa)*CO_2/19.63/k+(Set\%OA(1-ER\%oa)*(T_{OA}-ERtoa)+(T_{RA}-ERtra)*(1-(Set\%OA(1-ER\%oa)));$$

wherein $CO_2$ is a maximum allowable concentration of Carbon Dioxide in parts per million, k is a factor associated with said burner, $T_{OA}$ is an output of said first temperature sensor, $ERtoa$ is an accuracy or error associated with said first temperature sensor, $T_{RA}$ is an output of said second temperature sensor, and $ERtra$ is an accuracy of error associated with said second temperature sensor.

13. A method of controlling a direct fired recirculating air heater having a burner, an outdoor air path to the heater, a return air path to the heater, and a discharge path from the heater, said method comprising:
   determining a proportion of outdoor air being inducted to said heater;
   measuring outdoor air temperature and return air temperature; and
   controlling said heater as a function of at least the measured outdoor air temperature and return air temperature and the proportion of outdoor air being inducted to said heater.

14. The method of controlling a direct fired recirculating air heater in claim 13, wherein said heater includes a damper which is movable to adjust relative flows through said outdoor and return air paths, said method including determining a position of said damper and controlling at least one of said burner and said damper as a function of the measured outdoor air temperature and return air temperature and the position of said damper.

15. The method of controlling a direct fired recirculating air heater in claim 14 further including measuring discharge air temperature at said discharge air path.

16. The method of controlling a direct fired recirculating air heater in claim 15 further including controlling said at least one of said burner and said damper as a function of the measured discharge air temperature.

17. The method of controlling a direct fired recirculating air heater in claim 16 including controlling said at least one of said burner and said damper such that a temperature rise of air through the heater does not exceed a maximum allowable temperature rise determined by a position of said damper.

18. The method of controlling a direct fired recirculating air heater in claim 17 including providing a position sensor which senses a position of said damper.

19. The method of controlling a direct fired recirculating air heater in claim 18 including controlling said burner such that the discharge air temperature does not exceed a maximum allowable discharge air temperature determined by said position sensor and the measured outdoor air temperature and return air temperature.

20. The method of controlling a direct fired recirculating air heater in claim 17 including controlling said burner to maintain the discharge air temperature according to the following equation:

$$T_{DA} \leq \Delta T + (\%OA * T_{OA}) + T_{RA} * (1 - \%OA);$$

wherein $T_{DA}$ is the discharge air temperature, $\Delta T$ is the maximum allowable temperature rise, %OA is a percentage of outdoor air of the total air being inducted into said air heater, $T_{OA}$ is the measured outside air temperature, and $T_{RA}$ is the measured return air temperature.

21. The method of controlling a direct fired recirculating air heater in claim 20, wherein the maximum allowable temperature rise is determined by the percentage of outdoor air and the percentage of outdoor air is determined by the equation:

$$\%OA = Set\%OA(1 - ER\%oa);$$

wherein Set%OA is the position of said damper and ER%oa is an error associated with the position of said damper and an actual proportion of outside air passing through said damper.

22. The method of controlling a direct fired recirculating air heater in claim 21 further including providing a first temperature sensor to measure the outdoor air temperature and providing a second temperature sensor to measure the return air temperature.

23. The method of controlling a direct fired recirculating air heater in claim 22, wherein the step of controlling said burner to maintain the discharge air temperature is performed according to the following equation:

$$T_{DA} \leq (Set\%OA(1-ER\%oa)*CO_2/19.63/k+(Set\%OA(1-ER\%oa)*(T_{OA}-ERtoa)+(T_{RA}-ERtra)*(1-(Set\%OA(1-ER\%oa)));$$

wherein $CO_2$ is a maximum allowable concentration of Carbon Dioxide in parts per million, k is a factor associated with said burner, $T_{OA}$ is an output of said first temperature sensor, ERtoa is an accuracy or error associated with said first temperature sensor, $T_{RA}$ is an output of said second temperature sensor, and ERtra is an accuracy of error value associated with said second temperature sensor.

* * * * *